United States Patent [19]

Jobelius et al.

[11] Patent Number: 5,485,987
[45] Date of Patent: Jan. 23, 1996

[54] CYLINDER PISTON DEVICE

[75] Inventors: Klaus-Dieter Jobelius, Boppard; Helmut Morgen, Mannebach; Heinrich Spurzem, Mayen; Stefan Völpel, Koblenz, all of Germany

[73] Assignee: Stabilus GmbH, Koblenz-Neuendorf, Germany

[21] Appl. No.: 821,190

[22] Filed: Jan. 15, 1992

[30] Foreign Application Priority Data

Jan. 21, 1991 [DE] Germany .................. 41 01 567.3

[51] Int. Cl.$^6$ .................. F16F 9/02; F16F 9/34; E05F 3/02; E05F 15/02
[52] U.S. Cl. .................. 267/64.28; 188/322.17
[58] Field of Search .................. 267/64.11, 64.28, 267/129; 188/277, 322.17, 299; 277/26, 28, 34, 235 A, 16.6

[56] References Cited

U.S. PATENT DOCUMENTS

| | | | |
|---|---|---|---|
| 4,342,448 | 8/1982 | Wallis | 267/64.28 |
| 4,360,192 | 11/1982 | Ishida | 267/64.28 |
| 4,485,899 | 12/1984 | Grundel | 188/277 |
| 4,508,020 | 4/1985 | Szcupak | 188/322.17 |
| 4,736,824 | 4/1988 | Dony et al. | 188/322.17 |
| 4,958,706 | 9/1990 | Richardson et al. | 188/277 |
| 5,064,030 | 11/1991 | Wossner | 188/297 |

FOREIGN PATENT DOCUMENTS

| | | |
|---|---|---|
| 14000 | 6/1928 | Australia . |
| 14541 | 7/1928 | Australia . |
| 2457938 | 6/1976 | Germany . |
| 8906615 | 8/1989 | Germany . |
| 3919945 | 12/1990 | Germany . |
| 913622 | 12/1962 | United Kingdom . |

*Primary Examiner*—Matthew C. Graham
*Attorney, Agent, or Firm*—Brumbaugh, Graves, Donohue & Raymond

[57] ABSTRACT

According to an illustrative example of the invention, a gas spring is provided with an emergency exit permitting escape of pressurized gas in case of said pressurized gas exceeding a predetermined pressure. The emergency exit is provided by a radial bore through the cylinder. This radial bore is covered under normal conditions by a piston rod seal. This piston rod seal is axially displaceable by said pressurized gas at said predetermined pressure such that the radial bore is opened for escape of pressurized gas.

55 Claims, 5 Drawing Sheets

CYLINDER PISTON DEVICE

BACKGROUND OF THE INVENTION

Cylinder piston devices like gas springs or hydropneumatic springs or hydromechanic springs are frequently used as positioning and gravity compensating elements in many mechanical constructions, for example, in motor vehicles for positioning and weight compensation of boot flaps or engine hoods. Moreover, such cylinder piston devices are used as pressure storing elements. The extension force of such cylinder piston devices is adapted to the respective application by selecting the pressure of a fluid within the respective cylinder piston device. The pressure of this fluid within the cylinder piston device can be increased considerably beyond the respective operational pressure by increase of temperature or by mechanical deformation of the device itself or the mechanical construction incorporating the respective cylinder piston device.

STATEMENT OF THE PRIOR ART

From the German patent application 24 57 938 it is known to provide breaking points on at least one of the cylinder and the piston rod to act as emergency exit for the respective pressurized fluid. In case of temperature increase by fire or in case of mechanical deformation of the respective vehicle by a crash accident the cylinder or piston rod can break. Thus the pressurized fluid can escape. There is, however, a risk that parts of the cylinder piston device are separated from the remainder of the cylinder piston device at the breaking points. The separated parts may fly away with high velocity and are a risk for sensitive parts of the respective mechanical construction and for persons standing close to the cylinder piston device.

OBJECT OF THE INVENTION

It is a primary object of the present invention to provide a cylinder piston device with an emergency exit for the respective pressurized fluid in which an escape of the pressurized fluid without the risk of constructional members flying away is possible.

It is a further object of the present invention to provide a cylinder piston device which is in case of an opening of the emergency exit still operable at least to such an extent that the piston rod is still axially guided by the cylinder.

It is a further object of the present invention to provide a cylinder piston device in which the opening of the emergency exit occurs within a relatively narrow range adjacent a predetermined temperature and/or within a narrow range adjacent a predetermined pressure of the fluid.

It is a further object of the present invention to provide a cylinder piston device which can be easily and at low costs manufactured in accordance with usual design principals.

SUMMARY OF THE INVENTION

A cylinder piston device comprises a cylinder member having an axis, a circumferential wall and two ends and defining a cavity within the cylinder member axially between the two ends. A piston rod member is axially guided through at least one of the two ends by piston rod guiding and sealing means. A volume of pressurized fluid is provided within the cavity and acts onto the piston rod member. An emergency exit permits escape of fluid from the cavity under emergency conditions. The piston rod member is telescopically movable with respect to the cylinder member against the action of the pressurized fluid. The cylinder member and the piston rod member have basic operational shapes. The basic operational shapes of the cylinder member and the piston rod member are substantially unchangeable in case of an opening of the emergency exit. As the shape of the cylinder member and the shape of the piston rod member remain substantially unchanged in case of an opening of the emergency exit there is no risk of parts of the cylinder member and the piston rod member flying away into the sourrounding space.

The piston rod member remains telescopically movable with respect to the cylinder member along a major part of an operational stroke of the piston rod member in case of the emergency exit being opened. As a result thereof the constructional parts of the construction incorporating the respective cylinder piston device are still movable with respect to each other when the emergency exit is opened due to increased temperature or due to increased pressure. While the expected function of the cylinder piston device of, for example, weight compensation is not further fulfilled after escape of the pressurized fluid the movement of the respective parts of the mechanical construction by hand is not prevented. This can be of considerable value in case of an accident especially a fire accident.

If the piston rod is provided with a piston unit within a cavity and a piston unit is movable along an operational range of movement with respect to the cylinder member, the emergency exit should be located at a location of the cylinder member axially remote from the operational range of movement.

According to a preferred design principle the emergency exit comprises fluid passage means for connecting the cavity with atmosphere and a valve member. The valve member is changeable from a closing status to an opening status in response to a predetermined value of at least one of: pressure of the fluid and temperature at a temperature-sensing location of the cylinder piston device. The fluid passage means are thus closed by the valve member in the closing status thereof and permit escape of fluid in the opening status of the valve member.

In order to prevent flying away of the valve member the cylinder piston device may comprise catching means preventing separation of the valve member from the cylinder piston device in case of transition of the valve member from the closing status towards the opening status. These catching means may be provided by the cavity itself when the valve member is provided within the cavity.

Preferably the fluid passage means and the valve member are located at a location outside an operational range of movement of a piston unit connected with the piston rod member inside the cavity. Thus any conflict of the piston unit with the valve member is avoided.

For example, the fluid passage means and the valve member may be located adjacent the guiding and sealing means of the piston rod member.

Alternatively, the passage means and the valve member may be located adjacent an end wall of the cylinder member remote from the guiding and sealing means.

The valve member may be a sliding valve member movable along a sliding face of the cylinder piston device and the fluid passage may intersect with the sliding face.

The valve member is, for example, directly subject to the pressure of the pressurized fluid and is supported in its closing status by support means against the action of the pressurized fluid acting onto the valve member. In this case the support means can be sensitive to the predetermined value of either the pressure of the fluid and/or the temperature-sensing location of the cylinder piston device. The temperature-sensing location is preferably the location of the support means themselves.

The support means may be destroyable in response to the predetermined value of pressure of the pressurized fluid. Alternatively, the support means may be destroyable in response to the predetermined value of temperature. According to a further alternative the support means may be destroyable by combined action of increased pressure and increased temperature.

A still further alternative is to provide support means having a temperature-sensitive support capability decreasing with increasing temperature such that at the predetermined value of temperature, the support capability is insufficient to maintain the valve member in the closing status against the action of the pressurized fluid.

The support means may also be elastic support means according to a further alternative.

A further design principle is possible according to which the valve member is destroyable in response to the predetermined value of at least one of: pressure of the fluid and temperature at a temperature-sensing location of the cylinder piston device.

In order to obtain a most simple mechanical design a substantially cylindrical internal sliding face may be provided adjacent the circumferential wall. In this case the sliding valve member may be an annular valve member cooperating with the substantially cylindrical internal sliding face.

The annular valve member may comprise a piston rod sealing member located radially between the cylindrical wall and the piston rod member. Such the piston rod sealing member fulfills a second function besides its sealing function. Thus the total design becomes less expensive and requires a reduced number of components.

The annular valve member may be axially supported by an annular support member. This annular support member may be axially supported adjacent an end thereof remote from the annular valve member by the cylinder member adjacent that end therof through which the piston rod member is guided. The annular support member may again be sensitive to the predetermined value of at least one of: pressure of the fluid and temperature at the temperature-sensing location.

A most convenient form of the annular support member comprises two axially subsequent and radially off-set ring portions interconnected by radial connection means. These radial connection means are destroyable in response to a predetermined axial force exerted by the pressurized fluid through the annular valve member onto the annular support member. Thus the ring portions are telescopically movable with respect to each other in response to destruction of the radial connection means. The radial connection means may be an integral part of said ring portions.

Alternatively, the annular support member may be made of a material of a rigidity decreasing with increasing temperature. Thus in case of a fire accident the support member becomes weaker and is finally overcome by the force exerted by the pressurized fluid.

There is further the possibility of using an annular support member comprising annular spring means. These annular spring means may, for example, comprise a stack of cup springs.

The fluid passage means may comprise at least one bore extending in radial direction through the circumferential wall at or adjacent the substantially cylindrical internal sliding face. Thus the bore may be covered or uncovered according to the axial position of the annular valve member. Alternatively, the fluid passage means may comprise at least one substantially axially extending groove adjacent the substantially cylindrical internal sliding face. In this case the fluid passage means are opened when the groove extends across the annular valve member.

The design principle of a destroyable valve member may be realized in practice as follows: the valve member is an annular valve member located radially between the circumferential wall and the piston rod member and is subject to the pressure of the pressurized fluid. The annular valve member is axially supported against the pressure of the pressurized fluid by an annular support face. This annular support face supports, however, only one of two radially adjacent ring portions of the annular valve member. A second one of the ring portions is unsupported. The first and the second ring portions are axially shearable with respect to each other in response to the predetermined value of the pressurized fluid. The shearing stability may be also influenced by the temperature. Also with this embodiment the annular valve member may be an annular piston rod sealing member such that the annular valve member fulfills a double function.

The annular valve member may comprise in such a construction a resilient sealing material reinforced by a reinforcing ring member. This reinforcing ring member may be provided with a weakened zone sensitive to shearing forces.

The fluid passage means may comprise a fluid collecting chamber within the cylinder member. The fluid collecting chamber may have an exit towards atmosphere.

The guiding and sealing means may comprise an annular guiding member having an internal guiding surface. In such a construction the fluid passage means may comprise at least one substantially axially extending groove in the guiding surface.

The pressurized fluid is preferably a pressurized gas. In this case the cylinder piston device acts as a so called gas spring.

The various features of novelty which characterize the invention are pointed out with particularity in the claims annexed hereto and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereinafter with reference to embodiments shown in the accompanying drawings in which.

DETAILED DESCRIPTION OF THE PREFERRED EMBODIMENTS

Figure 1:
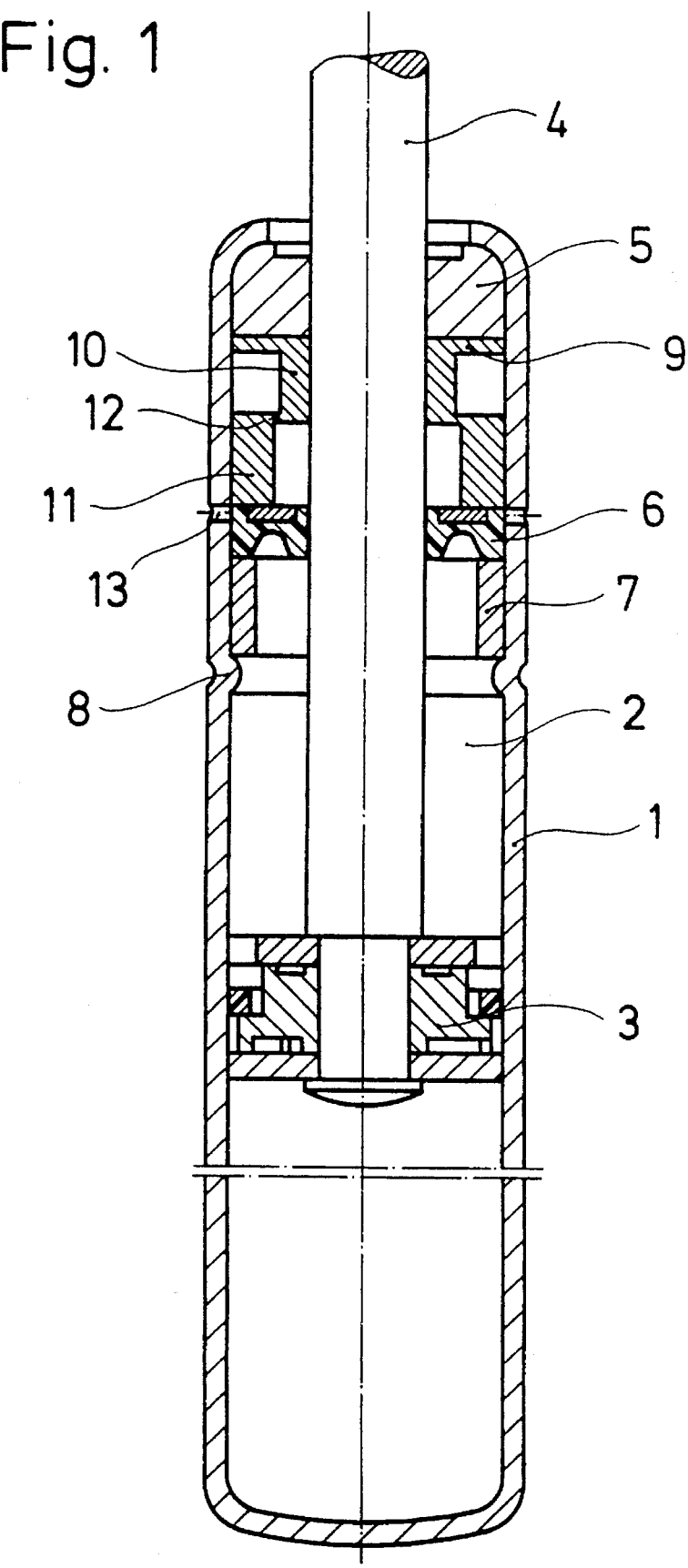
FIG. 1 is a longitudinal section through a pneumatic gas spring with a destroyable support bush.

When employing such cylinder piston rods in the construction of motor vehicles to simplify operation of the boot flap or the engine hood, pneumatic or hydropneumatic springs are preferred. For this purpose, the cylinder piston rod is articulated on the one hand to the flap or hood and, on the other hand, to a part which is rigid with the chassis. The gas spring according to FIG. 1 has a cylinder 1 in the cavity 2 of which there is provided a pressurized fluid preferably a gas filling. A piston rod 4 is provided with a piston 3 and is guided through a piston rod guide 5 and a piston rod seal 6 in the cylinder 1. The cavity 2 is sealed from the exterior. At least a small quantity of liquid lubricant is provided in the cavity 2 for lubricating the piston rod 4. A spacer bush 7 is supported on the one hand by a radially inwards directed annular projection 8 acting as a stop and serves, on the other hand, as an abutment for the piston rod seal 6. Between the piston rod guide 5 and the piston rod seal 6 there is located a destroyable support bush 9 which consists of a radially inner ring portion 10 and a radially outer ring portion 11. These ring portions 10 and 11 are connected by a connecting bridge 12. The connecting bridge 12 is dimensioned such that it breaks from a predetermined axial force acting onto the support bush 9. In this case, the outer ring portion 11 is slid over the inner ring portion 10 so that the piston rod seal 6 can move axially upwardly and, in so doing, passes over and clears bores 13 arranged in the cylinder 1 so that the pressurized fluid in the cavity 2 can escape via these bores 13 into the atmosphere owing to the displacement of the piston rod seal 6. Protection against excess pressure is provided in this way, avoiding an unallowably high rise in pressure in the cavity 2. The connecting bridge 12 of the support bush 9 is designed such that it breaks only when the pressure in the cavity 2 unallowably exceeds a predetermined pressure above the operating pressure, which can occur, for example, during a fire in the vehicle.

Figure 2:
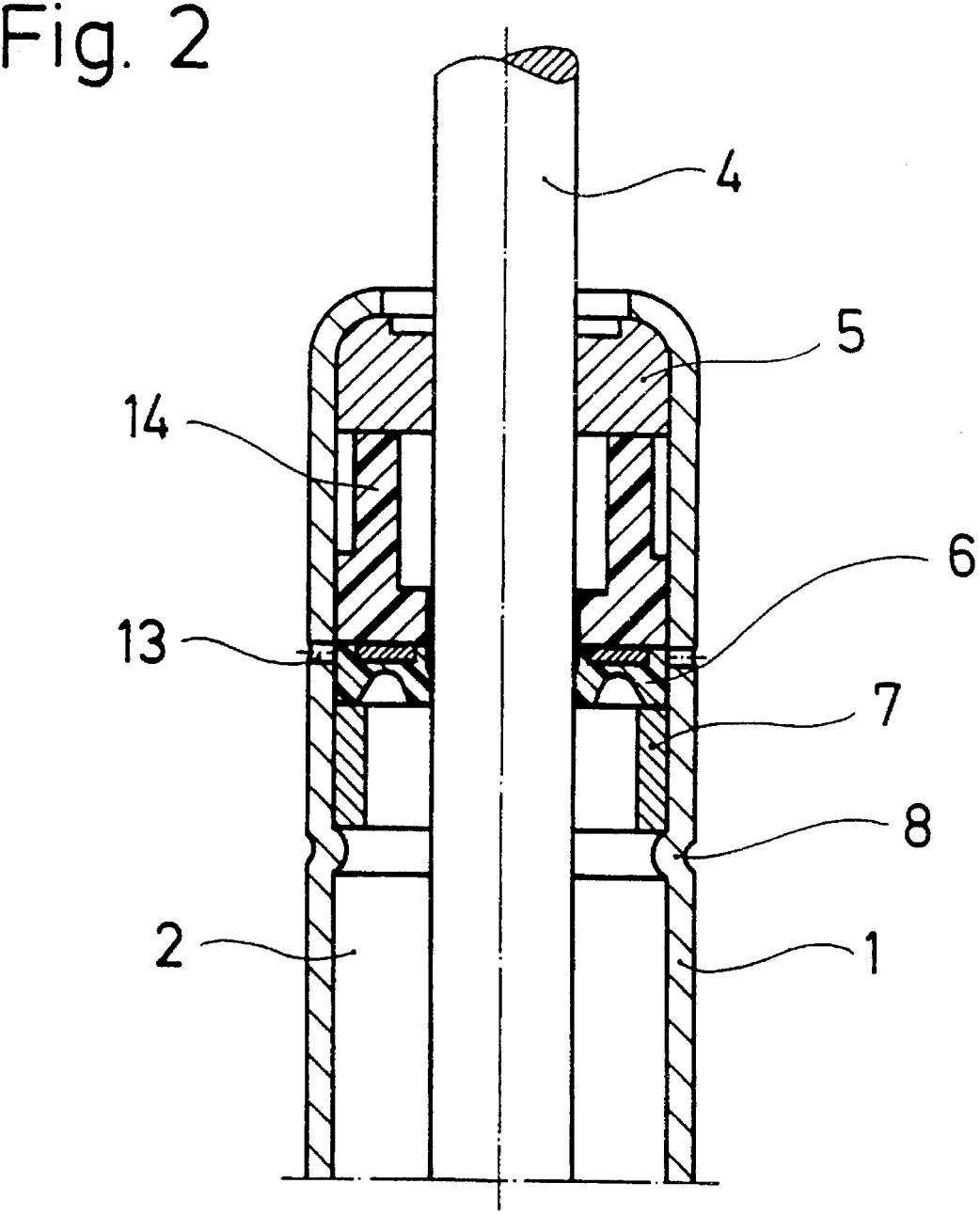
FIG. 2 shows a detail of a gas spring in the region of the piston rod seal with a support ring weakenable at increasing temperature.

In the embodiment according to FIG. 2, the annular support member arranged between the piston rod guide 5 and the piston rod seal 6 consists of a thermoplastic polymer. The yieldability of this support bush 14 is so great at a predetermined temperature that the piston rod seal 6 clears the bores 13 and the cavity 2 is therefore opened to the atmosphere so that, at an unallowably high temperature of the gas spring, the pressure can be blown out of the cavity 2. Parts which are equivalent to those parts of FIG. 1 are designated by the same reference numerals.

Figure 3:
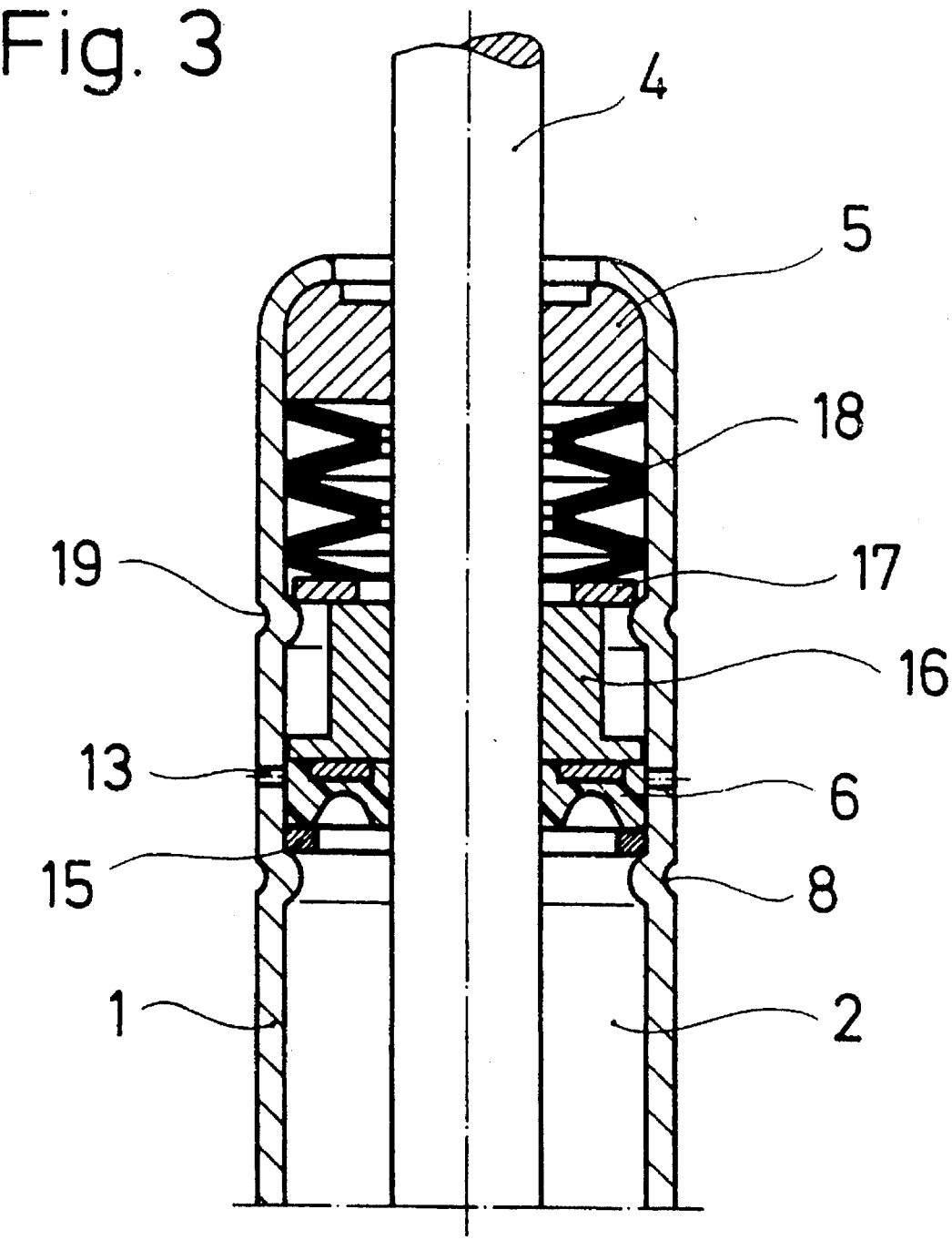
FIG. 3 shows the region of the piston rod seal of a gas spring with a support spring.

The embodiment according to FIG. 3 exhibits a piston rod seal 6 which is supported against the pressure in the cavity 2 via a pretensioned spring formed by Belleville spring washers 18. These Belleville spring washers 18 are supported on the one hand on a lower end face of the piston rod guide 5 and act onto a contact ring 17 of which the axial movement is limited by a stop 19. The spacer ring 16 rests on the piston rod seal 6 and cooperates with the contact ring 17 so that, in the event of an unallowably high rise in temperature in the cavity 2, the piston rod seal 6 is displaced upwardly against the force of the prestressed Belleville spring washers 18 and the connection between the cavity 2 and the atmosphere via the bores 13 is thus produced. An abutment ring 15 which is supported on the projection 8 of the cylinder 1 is provided for limiting the piston rod seal 6 axially from the cavity 2.

Figure 4:
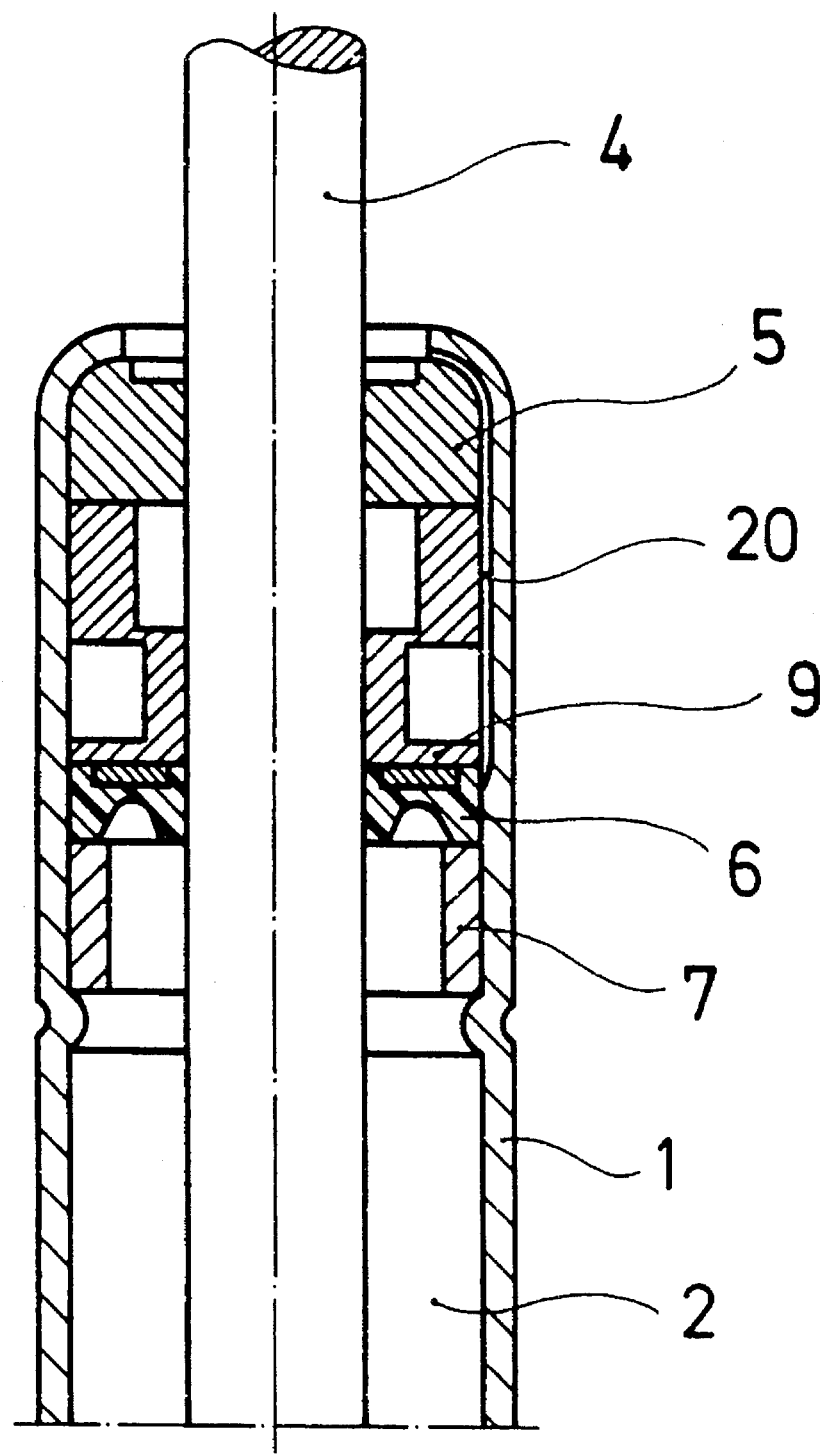
FIG. 4 shows the region of the piston rod seal of a gas spring, wherein the fluid passage is formed by a longitudinal groove.

The embodiment shown in FIG. 4 differs from the one in FIG. 1 essentially in that a longitudinal groove 20 located in the cylinder 1 cooperates with the piston rod seal 6. This longitudinal groove 20 bridges over the support bush 9 and the piston rod guide 5 and opens into the atmosphere. As the pressure in the cavity 2 rises above a maximum permitted extreme pressure, the support bush 9 is slid together by breakage of the connecting bridge and the piston rod seal 6 travels over the longitudinal groove 20. The connection between the cavity 2 and the atmosphere via the longitudinal groove 20 is then produced. The longitudinal groove 20 is advantageously formed by cold working so that no splinters or burrs are formed, which could impair operation of the cylinder piston device.

Figure 5:
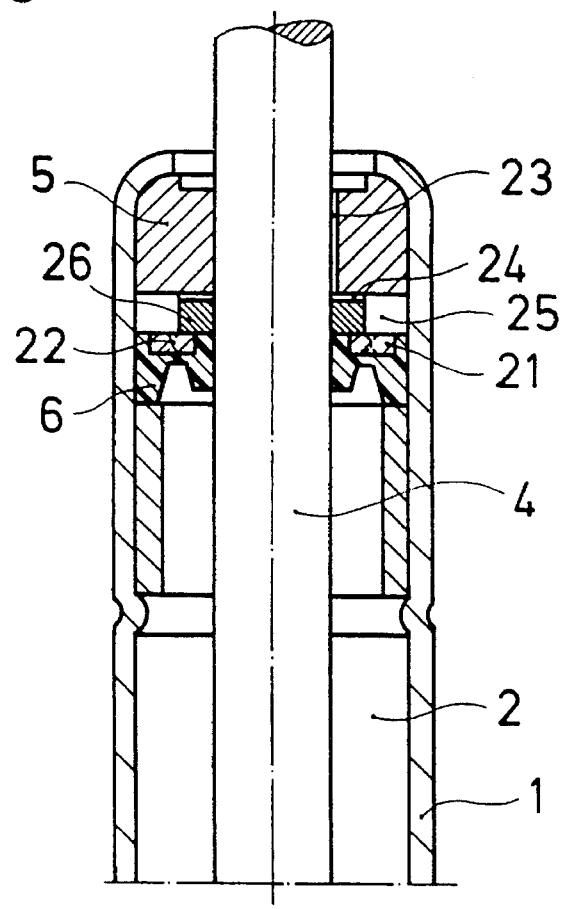
FIG. 5 shows a further embodiment in which the piston rod seal is provided with a destroyable disk and FIG. 6 shows the gas spring according to FIG. 5 with the disk being broken.
Figure 6:
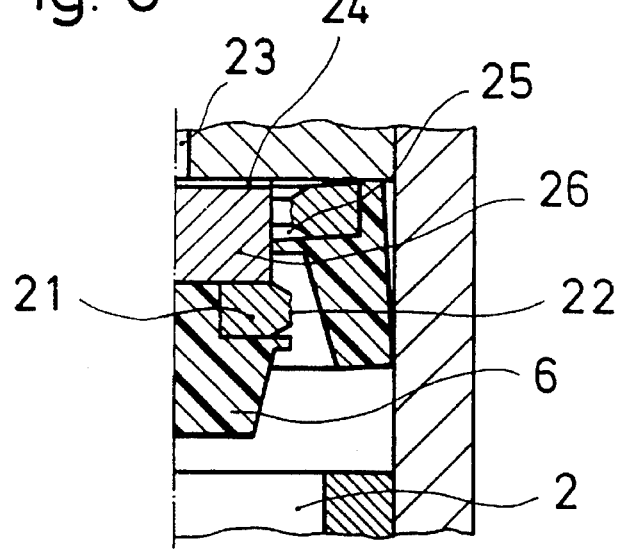

A further embodiment of a cylinder piston device shown in FIGS. 5 and 6 comprises a shearable disk 21 which is embedded into the piston rod seal 6. The upper end face of the piston rod seal 6 rests on an abutment ring 26 which forms a chamber 25 with the internal side of the cylinder 1. This chamber 25 communicates via at least one radially extending channel 24 and an axial groove 23 with the atmosphere. The axial groove can also be replaced be a clearance between the piston rod 4 and the piston rod guide 5, such forming an axial channel which is annular in cross section. The shearable disk 21 has a predetermined breaking point 22 which is designed such that the shearable disk is sheared if a maximum allowable pressure in the cavity 2 is exceeded. The piston rod seal 6 is also divided in such situation and the radially outer part of the piston rod seal resting on the internal wall of the cylinder 1 is pressed with the associated part of the shearable disk 21 into the chamber 25, as shown in FIG. 6. The connection between the cavity 2 and the atmosphere is thus produced and the pressurized fluid can escape from the cavity 2 via the radially extending channel 24 and the axial groove 23 into the atmosphere so that the internal pressure of the gas spring is reduced.

While specific embodiments of the invention have been shown and described in detail to illustrate the application of the inventive principles, it will be understood that the invention may be embodied otherwise without departing from such principles.

We claim:

1. A cylinder piston device comprising a cylinder member having an axis, a circumferential wall and two ends and defining a cavity within said cylinder member axially between said two ends, a piston rod member axially guided through at least a first one of said two ends by piston rod guiding and sealing means, a volume of pressurized fluid within said cavity and acting onto said piston rod member and an emergency exit permitting escape of fluid from said cavity under emergency conditions, said piston rod member being telescopically movable with respect to said cylinder member against the action of said pressurized fluid, said cylinder member and said piston rod member having respective basic operational shapes, said basic operational shapes of said cylinder member and said piston rod member being substantially unchangeable in case of an opening of said emergency exit, said emergency exit comprising fluid passage means for connecting said cavity with atmosphere and a valve member, said valve member being changeable from a closing status to an opening status in response to a predetermined value of at least one of: pressure of said fluid and temperature at a temperature-sensing location of said cylinder piston device, said fluid passage means being closed by said valve member in said closing status thereof and permitting escape of fluid in the opening status of said valve member, said valve member being an annular valve member located radially between said circumferential wall and said piston rod member and being subject to pressure by said pressurized fluid, said annular valve member being axially supported against pressure by said pressurized fluid by an annular support face, said annular support face supporting only one of two radially adjacent ring portions of said annular valve member, a second one of said ring portions being unsupported, said first and said second ring portions being axially shearable with respect to each other in response to said predetermined value of said pressurized fluid.

2. A cylinder piston device as set forth in claim 1, said annular valve member being an annular piston rod sealing member.

3. A cylinder piston device as set forth in claim 1, said annular valve member comprising a resilient sealing material reinforced by a reinforcing ring member, said reinforcing ring member being provided with a weakened zone sensitive to shearing forces.

4. A cylinder piston device comprising a cylinder member having an axis, a circumferential wall and two ends and defining a cavity within said cylinder member axially between said two ends, a piston rod member axially guided through at least a first one of said two ends by piston rod guiding and sealing means, a volume of pressurized fluid within said cavity and acting onto said piston rod member and an emergency exit permitting escape of fluid from said cavity under emergency conditions, said piston rod member being telescopically movable with respect to said cylinder member against the action of said pressurized fluid, said emergency exit being located adjacent said first end, said piston rod guiding and sealing means comprising an annular piston rod sealing member located radially between said circumferential wall of said cylinder member and said piston rod member, said piston rod sealing member acting as a closure member closing communication between said cavity and atmosphere surrounding said cylinder member through said emergency exit, a first side of said piston rod sealing member being exposed to said pressurized fluid within said cavity, said piston rod sealing member being axially supported at a second side by sealing member support means maintaining said piston rod sealing member in a closing position under normal operational conditions against the pressure of said pressurized fluid acting onto said first side such that, under normal operational conditions, said piston rod sealing member interrupts communication between said cavity and atmosphere surrounding said cylinder member through said emergency exit, said piston rod sealing member having cross-sectional portions, when regarded along said axis, at least one of said cross-sectional portions being axially movable in a direction away from said cavity toward said first end in response to a predetermined pressure of fluid exceeding a pressure range of normal operational conditions such that, at said predetermined pressure of said fluid, said cavity is connected with atmosphere outside said cylinder member through said emergency exit.

5. A cylinder piston device as set forth in claim 4, said sealing member support means being axially collapsible in response to said predetermined pressure so as to permit axial movement of said piston rod sealing member as a whole in response to said predetermined axial pressure for opening said communication between said cavity and said atmosphere surrounding said cylinder member.

6. A cylinder piston device as set forth in claim 5, said emergency exit comprising at least one radially directed opening through said circumferential wall, said at least one radially directed opening being closed by said piston rod sealing member under normal operational conditions.

7. A cylinder piston device as set forth in claim 4, said sealing member support means being elastically compressible support means and being axially compressible in response to said predetermined pressure so as to allow axial movement of said piston rod sealing member as a whole in response to said predetermined pressure.

8. A cylinder piston device as set forth in claim 7, said emergency exit comprising at least one radially directed opening through said circumferential wall, said at least one radially directed opening being closed by said piston rod sealing member under normal operational conditions.

9. A cylinder piston device as set forth in claim 7, said elastically compressible support means being axially precompressed under normal operational conditions.

10. A cylinder piston device as set forth in claim 4, said cross-sectional portions being separable from each other in response to said predetermined pressure, one of said cross-sectional portions being axially movable with respect to another one of said cross-sectional portions after such separation.

11. A cylinder piston device as set forth in claim 10, said piston rod sealing member being made of resilient material and being provided with a reinforcing member bridging said cross-sectional portions and being shearable in axial direction substantially along a separation line between said cross-sectional portions.

12. A cylinder piston device as set forth in claim 11, said reinforcing member being provided with a weakened zone.

13. A cylinder piston device as set forth in claim 10, said cross-sectional portions comprising a radially inner portion and a radially outer portion of said piston rod sealing member, said piston rod sealing member being made of elastic material, said piston rod sealing member being reinforced by a reinforcing ring member, said reinforcing ring member having a radially outer annular zone and a radially inner annular zone, said radially outer annular zone being allocated to said radially outer cross-sectional portion, and said radially inner annular zone being allocated to said radially inner cross-sectional portion, said sealing member support means being in axial supporting alignment only with one of said radially inner zone and said radially outer zone.

14. A cylinder piston device as set forth in claim 10, said emergency exit comprising venting means venting a space provided on said second side of said piston rod sealing member remote from said cavity.

15. A cylinder piston device as set forth in claim 10, said one cross-sectional portion being axially non-supported by said sealing member support means under normal operational conditions, and said another one of said cross-sectional portions being axially supported by said sealing member support means under normal operational conditions.

16. A cylinder piston device as set forth in claim 15, said cross-sectional portions being shearable with respect to each other in response to said predetermined pressure.

17. A cylinder piston device as set forth in claim 4, said cross-sectional portions comprising a radially outer annular portion and a radially inner annular portion.

18. A cylinder piston device as set forth in claim 4, said piston rod sealing member being made of resilient material and being reinforced by a reinforcing ring member.

19. A cylinder piston device as set forth in claim 4, said predetermined pressure being dependent on temperature.

20. A cylinder piston device as set forth in claim 19, said sealing member support means providing a resistance against axial compression which is dependent on temperature.

21. A cylinder piston device comprising a cylinder member having an axis, a circumferential wall and two ends and defining a cavity within said cylinder member axially between said two ends, a piston rod member axially guided through at least a first one of said two ends by piston rod guiding and sealing means, a volume of pressurized fluid within said cavity and acting onto said piston rod member and an emergency exit permitting escape of fluid from said cavity under emergency conditions, said piston rod member being telescopically movable with respect to said cylinder member against the action of said pressurized fluid, said emergency exit being located adjacent said first end, said piston rod guiding and sealing means comprising an annular piston rod sealing member located radially between said circumferential wall of said cylinder member and said piston rod member, said piston rod sealing member acting as a closure member closing communication between said cavity and atmosphere surrounding said cylinder member through said emergency exit, a first side of said piston rod sealing member being exposed to said pressurized fluid within said cavity, said piston rod sealing member being axially supported at a second side by sealing member support means maintaining said piston rod sealing member in a closing position under normal operational conditions against the pressure of said pressurized fluid acting onto said first side such that, under normal operational conditions, said piston rod sealing member interrupts communication between said cavity and atmosphere surrounding said cylinder member through said emergency exit, only a part of said second side of said piston rod sealing member being axially supported by said sealing member support means, said piston rod sealing member being destroyable in response to a predetermined axial pressure of said pressurized fluid within said cavity such that a communication is established between said cavity and atmosphere surrounding said cylinder member.

22. A cylinder piston device as set forth in claim 21, a substantially circular borderline existing between a supported part of said second side and a non-supported part of said second side, said circular borderline having its center substantially on said axis.

23. A cylinder piston device as set forth in claim 21, said piston rod sealing member being provided with a reinforcing member.

24. A cylinder piston device as set forth in claim 23, said reinforcing member being provided with a weakened zone.

25. A cylinder piston device comprising a cylinder member having an axis, a circumferential wall and two ends and defining a cavity within said cylinder member axially between said two ends, a piston rod member axially guided through at least a first one of said two ends by piston rod guiding and sealing means, a volume of pressurized fluid within said cavity and acting onto said piston rod member and an emergency exit permitting escape of fluid from said cavity under emergency conditions, said piston rod member being telescopically movable with respect to said cylinder member against the action of said pressurized fluid, said emergency exit being located adjacent said first end, said piston rod guiding and sealing means comprising a piston rod sealing ring unit located radially between said circumferential wall of said cylinder member and said piston rod member, said piston rod sealing ring unit acting as a closure member closing communication between said cavity and atmosphere surrounding said cylinder member through said emergency exit, a first side of said piston rod sealing ring unit being exposed to said pressurized fluid within said cavity, said piston rod sealing ring unit being axially supported at a second side by sealing unit support means for maintaining said piston rod sealing ring unit in a closing status under normal operational conditions against the pressure of said pressurized fluid acting onto said first side such that under normal operational conditions said piston rod sealing ring unit interrupts communication between said cavity and atmosphere surrounding said cylinder member through said emergency exit, said piston rod sealing ring unit being transferable to an opening status by at least one of destruction caused by an over pressure condition and axial displacement in a direction away from said cavity toward said first end in response to a predetermined pressure of fluid exceeding a pressure range of normal operational conditions such that at said predetermined pressure of said fluid said cavity is connected with atmosphere outside said cylinder member through said emergency exit.

26. A cylinder piston device comprising a cylinder member having an axis, a circumferential wall and two ends and defining a cavity within said cylinder member axially between said two ends, a piston rod member axially guided through at least a first one of said two ends by piston rod guiding and sealing means, a volume of pressurized fluid within said cavity and acting onto said piston rod member and at least one emergency exit permitting escape of fluid from said cavity under emergency conditions, said piston rod member being telescopically movable with respect to said cylinder member against the action of said pressurized fluid, said emergency exit being located adjacent one of said first and second ends, wherein said emergency exit is closed under normal operational conditions by a valve unit in sealing engagement with an internal face of said circumferential wall, said valve unit having a first side exposed to said pressurized fluid within said cavity and being axially supported adjacent a second side thereof by a support structure maintaining said valve unit in a closing condition under normal operational conditions against the pressure of said pressurized fluid acting onto said first side such that, under normal operational conditions, said valve unit interrupts communication between said cavity and atmosphere, said valve unit being transferable from said closing condition to an opening condition under which said emergency exit provides a fluid connection between said cavity and atmosphere, in response to the occurrence of an emergency condition, and wherein basic operational shape of said cylinder member and said piston rod member is unchanged in said opening condition.

27. A cylinder piston device as set forth in claim 26, wherein said valve unit is transferable from said closing condition to said opening condition under which said emergency exit provides a fluid connection between said cavity and atmosphere, in response to the occurrence of an emergency condition comprising resilient axial deformation of said support structure.

28. A cylinder piston device as set forth in claim 26, wherein said valve unit is transferable from said closing condition to said opening condition under which said emergency exit provides a fluid connection between said cavity and atmosphere, in response to the occurrence of an emergency condition comprising axial collapse of said support structure.

29. A cylinder piston device as set forth in claim 26, wherein said valve unit is transferable from said closing condition to said opening condition under which said emergency exit provides a fluid connection between said cavity and atmosphere, in response to the occurrence of an emergency condition comprising plastic axial deformation of said support structure.

30. A cylinder piston device as set forth in claim 26, wherein said valve unit is transferable from said closing condition to said opening condition under which said emergency exit provides a fluid connection between said cavity and atmosphere, in response to the occurrence of an emergency condition comprising destruction of said valve unit.

31. A cylinder piston device as set forth in claim 26, said piston rod member remaining telescopically movable with respect to said cylinder member along a major part of an operational stroke of said piston rod member in case of said emergency exit being opened.

32. A cylinder piston device as set forth in claim 26, said piston rod member being provided with a piston unit within said cavity, said piston unit being movable along an operational range of movement with respect to said cylinder member, said emergency exit being located at a location of said cylinder member axially remote from said operational range of movement.

33. A cylinder piston device as set forth in claim 26, said cylinder piston device comprising catching means preventing separation of said valve unit from said cylinder piston device in case of transition of said valve unit from said closing condition towards said opening condition.

34. A cylinder piston device as set forth in claim 26, said emergency exit and said valve unit being located at a location outside an operational range of movement of a piston unit connected with said piston rod member inside said cavity.

35. A cylinder piston device as set forth in claim 34, said valve unit being of annular shape and located adjacent said piston rod guiding and sealing means.

36. A cylinder piston device as set forth in claim 35, said annular valve unit being a component of said piston rod guiding and sealing means.

37. A cylinder piston device as set forth in claim 34, said emergency exit and said valve unit being located adjacent an end wall of said cylinder member remote from said piston rod guiding and sealing means.

38. A cylinder piston device as set forth in claim 26, said valve unit being a sliding valve unit sealingly movable along a sliding face of said cylinder member, said emergency exit intersecting said sliding face.

39. A cylinder piston device as set forth in claim 26, said support structure being sensitive to predetermined values of at least one of: pressure of said fluid and temperature at a temperature-sensing location of said cylinder piston device.

40. A cylinder piston device as set forth in claim 39, said support structure having a temperature-sensitive support capability decreasing with increasing temperature such that, at a predetermined value of temperature, the support capability is insufficient to maintain said valve unit in said closing condition against the action of a corresponding predetermined pressure of said pressurized fluid.

41. A cylinder piston device as set forth in claim 26, said support structure comprising spring means and preferably prestressed spring means.

42. A cylinder piston device as set forth in claim 41, said spring means comprising a stack of cup springs of the Belleville type.

43. A cylinder piston device as set forth in claim 26, said support structure being axially supported adjacent an end thereof remote from said valve unit by said piston rod guiding and sealing means.

44. A cylinder piston device as set forth in claim 26, said support structure comprising an annular shearing zone.

45. A cylinder piston device as set forth in claim 44, said support structure comprising two axially subsequent and radially off-set ring portions interconnected by radial connection means, said radial connection means being destroyable in response to a predetermined axial force exerted by said pressurized fluid through said annular valve unit onto said annular support structure, said ring portions being telescopically movable with respect to each other In response to destruction of said radial connection means.

46. A cylinder piston device as set forth in claim 45, said radial connection means being an integral part of said ring portions.

47. A cylinder piston device as set forth in claim 26, said emergency exit comprising at least one bore extending in radial direction through said circumferential wall at or adjacent said valve unit.

48. A cylinder piston device as set forth in claim 26, said emergency exit comprising at least one substantially axially extending groove in said internal face of said circumferential wall adjacent said valve unit.

49. A cylinder piston device as set forth in claim 26, said valve unit being axially supported against the pressure of said pressurized fluid by a support face of said support structure which supports only a part of the cross-sectional area of said valve unit.

50. A cylinder piston device as set forth in claim 49, said valve unit being an annular valve unit located radially between said circumferential wall and said piston rod member and being axially supported against the pressure of said pressurized fluid by an annular support face, said annular support face supporting only one of two radially adjacent ring portions of said valve unit, a second one of said ring portions being unsupported, said first and said second ring portions being axially shearable by said pressurized fluid.

51. A cylinder piston device as set forth in claim 50, said valve unit comprising a resilient sealing material reinforced by a reinforcing ring member, said reinforcing ring member being provided with a weakened zone sensitive to shearing forces.

52. A cylinder piston device as set forth in claim 26, said emergency exit comprising a fluid collecting chamber within said cylinder member, fluid collecting chamber having an exit towards atmosphere.

53. A cylinder piston device as set forth in claim 26, said guiding and sealing means comprising an annular guiding member having an internal guiding surface, said emergency exit comprising at least one substantially axially extending groove in said guiding surface.

54. A cylinder piston device as set forth in claim 26, said pressurized fluid being a pressurized gas.

55. A cylinder piston device comprising a cylinder member having an axis, a circumferential wall and two ends and defining a cavity within said piston rod member axially guided through at least a first one of said two ends by piston rod guiding and sealing means, a volume of pressurized fluid within said cavity and acting onto said piston rod member and an emergency exit permitting escape of fluid from said cavity under emergency conditions, said piston rod member being telescopically movable with respect to said cylinder member against the action of said pressurized fluid, said emergency exit being located adjacent one of said two ends, a sealing unit being located radially inside said circumferential wall of said cylinder member, said sealing unit being sealingly engaged with said circumferential wall and acting as a closure member closing communication between said cavity and atmosphere surrounding said cylinder member through said emergency exit, a first side of said sealing unit being exposed to said pressurized fluid within said cavity, said sealing unit being axially supported at a second side by sealing unit support means with respect to said one end, for maintaining said sealing unit in a closing status under normal operational conditions against the pressure of said pressurized fluid acting onto said first side such that under normal operational conditions said sealing unit interrupts communication between said cavity and atmosphere surrounding said cylinder member through said emergency exit, at least a part of said sealing unit being transferable to an opening status by destruction and/or axial displacement in a direction away from said cavity toward said one end in response to a predetermined pressure of fluid exceeding a pressure range of normal operational conditions such that at said predetermined pressure of said fluid said cavity is connected with atmosphere outside said cylinder member through said emergency exit.

* * * * *

UNITED STATES PATENT AND TRADEMARK OFFICE
CERTIFICATE OF CORRECTION

PATENT NO.    :  5,485,987
DATED         :  January 23, 1996
INVENTOR(S)   :  Klaus-Dieter Jobelius et al.

It is certified that error appears in the above-identified patent and that said Letters Patent is hereby corrected as shown below:

Col. 12, line 55, "said piston" should read --said cylinder member axially between said two ends, a piston--.

Signed and Sealed this

Eighth Day of October, 1996

Attest:

BRUCE LEHMAN

Attesting Officer          Commissioner of Patents and Trademarks